United States Patent
Seegmiller et al.

(10) Patent No.: US 12,422,273 B2
(45) Date of Patent: Sep. 23, 2025

(54) HANDLING UNMAPPED SPEED LIMIT SIGNS

(71) Applicant: ARGO AI, LLC, Pittsburgh, PA (US)

(72) Inventors: Neal Seegmiller, Pittsburgh, PA (US); Patrick Barone, San Francisco, CA (US); Xi Cai, Berkeley, CA (US); Aman Khurana, Pittsburgh, PA (US); Joshua Jaekel, Detroit, MI (US); Arsenii Saranin, Wexford, PA (US); Hasan Tafish, Foster City, CA (US)

(73) Assignee: Volkswagen Group of America Investments, LLC, Reston, VA (US)

(*) Notice: Subject to any disclaimer, the term of this patent is extended or adjusted under 35 U.S.C. 154(b) by 282 days.

(21) Appl. No.: 18/093,611

(22) Filed: Jan. 5, 2023

(65) Prior Publication Data
US 2024/0230366 A1    Jul. 11, 2024

(51) Int. Cl.
| | | |
|---|---|---|
| G01C 21/00 | (2006.01) | |
| G01C 21/34 | (2006.01) | |
| G06V 20/56 | (2022.01) | |
| G06V 20/58 | (2022.01) | |
| G08G 1/0962 | (2006.01) | |
| G08G 1/0967 | (2006.01) | |
| G08G 1/0968 | (2006.01) | |

(52) U.S. Cl.
CPC ..... G01C 21/3815 (2020.08); G01C 21/3461 (2013.01); G06V 20/582 (2022.01)

(58) Field of Classification Search
CPC ............ G01C 21/3815; G01C 21/3461; G06V 20/582; G06V 20/588
USPC ......................................................... 701/532
See application file for complete search history.

(56) References Cited

U.S. PATENT DOCUMENTS

| | | | |
|---|---|---|---|
| 2018/0265070 A1* | 9/2018 | Wiesbeck | B60W 20/12 |
| 2020/0151611 A1* | 5/2020 | McGavran | G09B 29/102 |
| 2020/0191591 A1* | 6/2020 | Zhang | G06V 20/582 |
| 2020/0231149 A1* | 7/2020 | Eggert | G08G 1/166 |
| 2022/0001896 A1* | 1/2022 | Watanabe | G01C 21/3492 |
| 2022/0207885 A1* | 6/2022 | Ansari | H04L 9/14 |
| 2023/0140569 A1* | 5/2023 | Foster | B60W 30/12 |
| | | | 701/400 |
| 2023/0250784 A1* | 8/2023 | Zhao | F02N 11/0803 |
| | | | 701/102 |

(Continued)

FOREIGN PATENT DOCUMENTS

DE    102015223656 A1 *    6/2017

*Primary Examiner* — Rachid Bendidi
*Assistant Examiner* — Hossam M Abd El Latif
(74) *Attorney, Agent, or Firm* — Sterne, Kessler, Goldstein & Fox P.L.L.C.

(57) ABSTRACT

Disclosed herein are system, method, and computer program product embodiments for handling unmapped speed limit signs. For example, the method includes receiving sensor data from a sensor of a vehicle, identifying a traffic sign within a field of view of the vehicle based on the sensor data, identifying one or more lane segments of a road associated with the identified traffic sign based on a determination that the identified traffic sign is not mapped in a priori map, and updating an attribute associated with a segment of the one or more lane segments of the road based on a determination that a detected attribute corresponding to the identified sign is more restrictive than an attribute associated with the lane segment in the a priori map.

15 Claims, 15 Drawing Sheets

(56) References Cited

U.S. PATENT DOCUMENTS

2024/0151549 A1\* 5/2024 Williamson ....... G01C 21/3833

\* cited by examiner

HANDLING UNMAPPED SPEED LIMIT SIGNS

BACKGROUND

Autonomous vehicles (AVs) rely on maps to navigate in a real-word environment during operation. A map may be a set of digital files including data identifying physical details of a geographic area such as roads, lanes within roads, traffic signals and signs, and road surface markings. The map may be generated using images of the surroundings captured by vehicles equipped with sensors such as light detection and ranging system (LIDAR), cameras, radar, and the like. An AV may receive the map before operation. The AV may use the map to augment the information that the AV's on-board perception system (e.g., cameras, LIDAR system) perceive.

In general, contents of the received map are static until the AVs download/receive an updated map. Map changes can occur due to new road constructions, repainting of roads, construction projects that may result in temporary lane changes and/or detours. Maps can change several times per day. For example, a new traffic sign (e.g., speed limit sign) may be installed and the changes are not reflected on the map. Thus, systems and methods are needed to incrementally update the map to reflect such changes.

SUMMARY

According to some aspects of this disclosure, a method includes receiving sensor data from a sensor of a vehicle, identifying a traffic sign within a field of view of the vehicle based on the sensor data, identifying one or more lane segments of a road associated with the identified traffic sign based on a determination that the identified traffic sign is not mapped in a priori map, and updating an attribute associated with a segment of the one or more lane segments of the road based on a determination that a detected attribute corresponding to the identified traffic sign is more restrictive than an attribute associated with the lane segment in the a priori map.

According to some aspects of this disclosure, a system includes at least one processor coupled to the memory. The at least one processor is configured to receive sensor data from a sensor of a vehicle, identify a traffic sign within a field of view of the vehicle based on the sensor data, identify one or more lane segments of a road associated with the identified traffic sign based on a determination that the identified traffic sign is not mapped in a priori map, and update an attribute associated with a segment of the one or more lane segments of the road based on a determination that a detected attribute corresponding to the identified traffic sign is more restrictive than an attribute associated with the lane segment in the a priori map.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
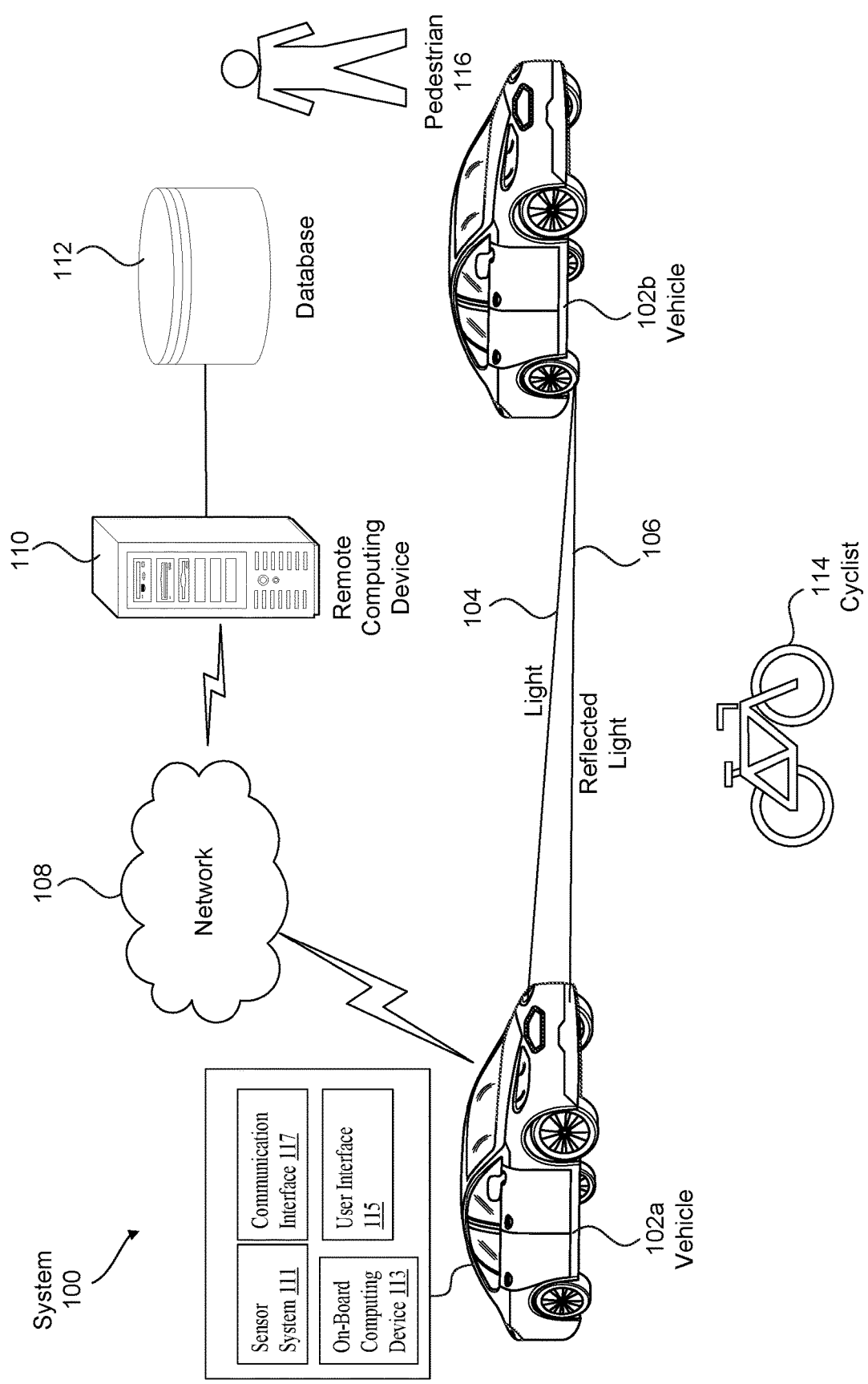
FIG. 1 illustrates an exemplary autonomous vehicle system, in accordance with aspects of the disclosure.

Provided herein are system, apparatus, device, method and/or computer program product embodiments, and/or combinations and sub-combinations thereof, for handling unmapped speed limit signs.

An autonomous vehicle (AV) may rely on a map (e.g., a base map, an a priori map, an a priori high definition (HD) map) of an operating area. The map may refer to a pre-generated map that is downloaded onto the AV and is used by the AV to help navigate its surroundings. The map may include information associated with the operating area. For example, the map may specify a geometry of a drivable area and lane markings, lane marking types, a direction of a lane, a speed limit associated with the lane, and traffic controls including traffic signs and traffic signals.

The map reduces the burden on the autonomy software of the AV to construct an accurate model of its environment. However, sometimes the map is inaccurate. Sometimes the AV may encounter an unmapped speed limit sign with an indicated speed limit that does not match the speed limit in the map. For example, if a new speed limit sign is placed alongside the road that was not present when data was collected for the map, it may be omitted from the map. If the vehicle does not detect and appropriately react to the new sign, it may result in a traffic violation. The new speed limit sign may be a temporary speed limit sign placed during construction work or a special event, or a permanent speed limit sign, either replacing an existing sign or where there was no sign previously. An unmapped speed limit sign may refer to a sign that is not included in the map or to a sign that is included in the map but has a different speed limit (e.g., there is a mismatch between the sign in the map and the detected sign).

According to some aspects of this disclosure, unmapped traffic signs are handled through dynamic map updates. This provides the advantage that all components of the AV that rely on the map receive the same and accurate updates in a timely manner (e.g., in real-time or near real-time). In addition, the approaches described herein does not necessitate any additional changes in a motion planning task or a prediction task of the AV.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
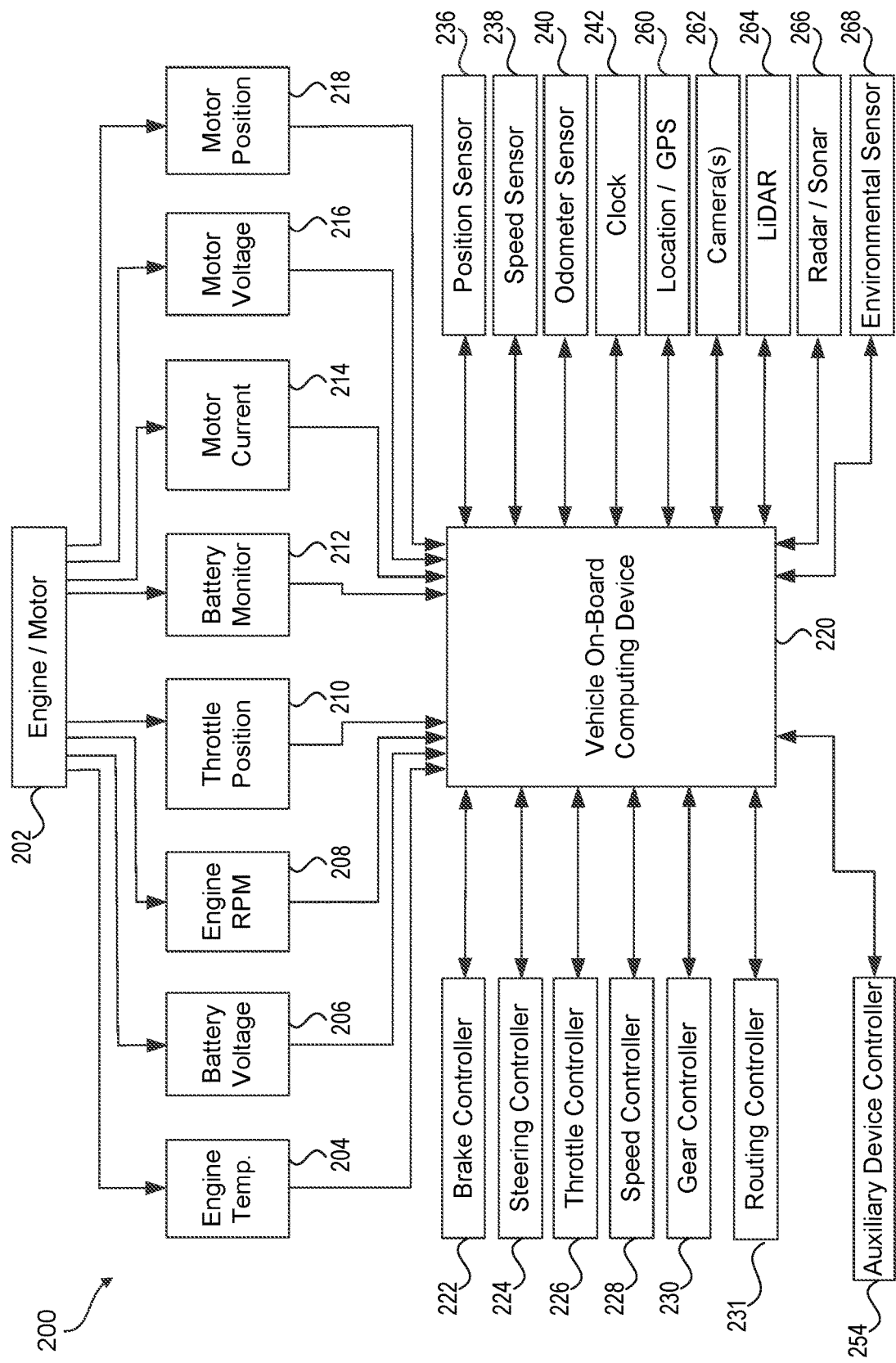
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a light detection and ranging system (LIDAR) system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. According to some aspects of this disclosure, the reflected light pulse may be detected using, but not limited to, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s), and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next-generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions, or other configurations as are known.

The communications interface 117 may be configured to allow communication between AV 102a and external systems, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102*a* including, for example, a keyboard, a touch screen display device, a microphone, and a speaker, etc.

FIG. 2 illustrates an exemplary system architecture 200 for a vehicle, in accordance with aspects of the disclosure. Vehicles 102*a* and/or 102*b* of FIG. 1 can have the same or similar system architecture as that shown in FIG. 2. Thus, the following discussion of system architecture 200 is sufficient for understanding vehicle(s) 102*a*, 102*b* of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 15. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

According to some aspects of this disclosure, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, roadway boundaries, other vehicles, pedestrians, and/or obstacles, etc. The on-board computing device 220 may use any now or hereafter-known object recognition algorithms, video tracking algorithms, and computer vision algorithms (e.g., track objects frame-to-frame iteratively over a number of time periods) to determine the perception.

According to some aspects of this disclosure, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their predicted future locations.

According to some aspects of this disclosure, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
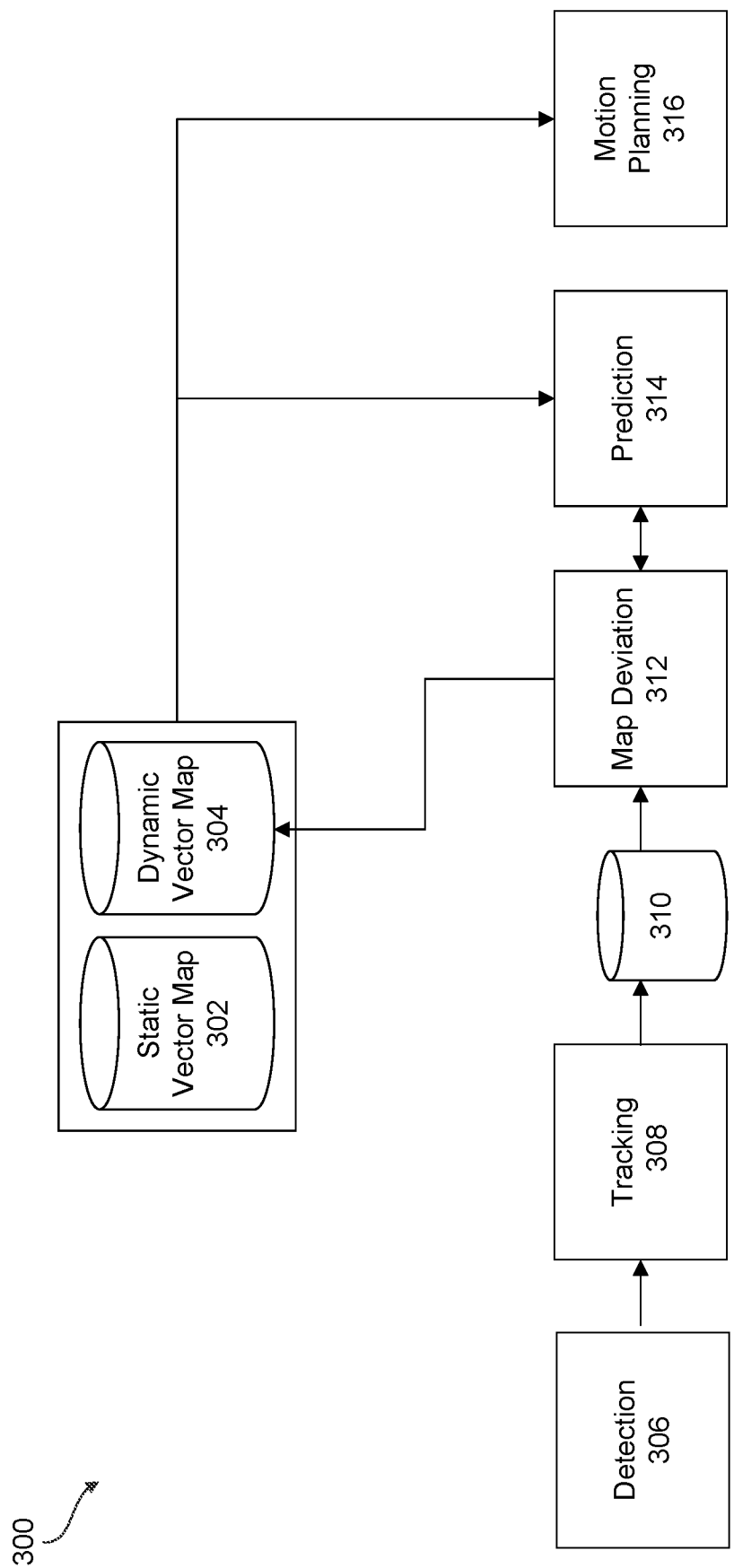
FIG. 3 is an example control flow of a system for handling unmapped traffic signs, in accordance with aspects of the disclosure.

FIG. 3 is a control flow of a system 300 for handling traffic signs, in accordance with aspects of the disclosure. Certain components of the system 300 may be embodied in processor hardware and computer-readable programming instructions that are part of the AV's on board computing system (e.g., on-board computing device 113 of FIG. 1).

According to some aspects of this disclosure, the control flow can begin by detecting an object using a detection task 306 (also referred to as perception system, task, or module). The detection task 306 may include hardware (sensors) and software (detection and tracking algorithms) that capture information about moving actors and other objects (e.g., road users, static obstacles, traffic signal state, and the like) that exist in the vehicle's immediate surroundings. Example sensors include cameras, LIDAR sensors, and radar sensors. The detection task 306 may detect one or more objects in the environment. For example, the detection task 306 may detect traffic control objects including, but not limited to, signs and/or the like. According to some aspects of this disclosure, the detection task 306 may detect speed limit signs and/or the like. According to some aspects of this disclosure, signs are detected using the fusion of camera and LIDAR sensor inputs (e.g., LIDAR system 264 of FIG. 2).

According to some aspects of this disclosure, the detection task 306 may deliver data and information to a tracking task 308. The tracking task 308 produces messages about all tracked signs. A tracked sign may be a detected sign that is tracked over time. The messages may include a probability distribution over a type of the detected sign (e.g., speed limit), a pose of the detected sign (position and orientation), a bounding geometry, a unique identifier, a timestamp of a first detection of the detected sign, and a probability of existence of the detected sign. The enumeration of sign types may include multiple speed limit sign types. That is, one for each numeric speed limit (e.g., speed limit 25 and speed limit 30 are different sign types in the probability distribution).

According to some aspects of this disclosure, sign detections may be associated with an existing set of tracked signs. The existing set of tracked signs provide information about the detected sign attributes over time. New tracks are created for detections that cannot be associated with any existing tracks. For example, a probability of the existence of the sign may be determined using a Bayes filter. The Bayes filter aggregates noisy detections over time to provide stable probability values.

According to some aspects of this disclosure, a determination is made whether the detected sign is mapped. For example, tracked traffic signs are compared against signs in the map in the tracking task 308. If the detected sign matches the type of the sign (including the same numeric speed limit) and is within a position and orientation tolerance of a mapped sign, the sign detection is determined to be already mapped. The probability that the sign is mapped can be calculated using a Bayes filter. The map update is not generated for mapped traffic signs because the mapped traffic signs are already accounted for in the map. Unmapped traffic signs may be stored in a database 310.

Tracked traffic signs may also be compared against a record of persistent false positive detections. The record of persistent false positive detections may be stored in the database 310. A persistent false positive detection may correspond to a detected sign that have been reported as an unmapped traffic sign a plurality of times by one or more vehicles. However, the reported sign is a false positive (e.g., an image of a traffic sign). Examples of false positive detections may include, but are not limited to, a sign that contains an image of a stop sign, but isn't itself a stop sign (e.g., a sign that warns of a stop sign ahead) or an image of a sign on a building or other structure that isn't actually a traffic sign (e.g., an image on a billboard). If the detected sign matches the sign type and is within a position and orientation tolerance of a known false positive, or within a bounding polygon of a known false positive, the tracked sign is filtered out to avoid the nuisance of slowing the AV.

According to some aspects of this disclosure, the record of persistent false positive may be updated from a server and propagated to AVs. Persistent false positive sign detections may be recorded in the map along with actual signs (e.g., in a static vector map 302). False positives may be identified by remote guidance operators or a map analyst (offline).

If the sign detection is not determined to be already mapped or a known false positive, a map update is generated by a map deviation task 312. Speed limit signs can be processed in order along the road (along a travel direction) such that the speed limit changes for nearer signs do not get propagated over speed limit changes for farther signs. In addition, map updates for unmapped speed limit signs are processed as "immediate" updates for minimal latency by the map deviation task 313 of FIG. 3.

The map update is propagated to all clients of the map. Clients may refer to software and/or hardware components of the AV that utilize the updated map to operate the AV (e.g., a prediction task 314, a motion planning task 316). All clients of the map receive the exact same updates. According to some aspects of this disclosure, the updates may be performed via application programming interfaces (APIs). According to some aspects of this disclosure, map updates may be communicated to the prediction task 314 and/or to the motion planning task 316 via shared memory. The unchanged map is not copied into the dynamic vector map cache. A dynamic vector map 304 may be sent to all clients that rely on the map. In addition, the updates are received with minimal latency (e.g., in real-time or near real-time). According to some aspects of this disclosure, a map interface associated with the static vector map 302 and the dynamic vector map 304 provides functions to query for both mapped and unmapped signs for a given lane segment. A lane segment may refer to a segment of a road where the AVs and other vehicles move in a single-file fashion in a single direction. Multiple lane segments may occupy the same physical space (e.g., in an intersection). For example, the motion planning task 316 may query the static vector map 302 and the dynamic vector map 304 to retrieve a speed limit associated with a segment of the road. The motion planning task 315 plans trajectories with velocities not to exceed the posted speed limit. Likewise other dependents of speed limit in the map, such as prediction (e.g., prediction task 314 of FIG. 3), automatically get updated speed limits from the map deviation task 312.

The modules described with respect to FIG. 3 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units/components, such as a volatile memory, a nonvolatile memory, an internal memory, an external memory, or a combination thereof. The non-transitory computer readable medium may be integrated as a part of the system 300 or installed as a removable portion of the system 300.

As discussed above, map updates are generated for the detected unmapped signs. Map updates are generated for a lane segment associated with the detected unmapped sign and for successors and neighbors of the lane segment associated with the detected unmapped sign. A successor of a lane segment may refer to another lane segment that comes after the lane segment. A neighbor lane segment may refer to a lane segment adjacent (e.g., of an adjacent lane on the road) to the lane segment associated with the detected unmapped sign and may have the same travel direction. According to some aspects of this disclosure, neighbor lane segments may have opposing travel directions.

Figure 4:
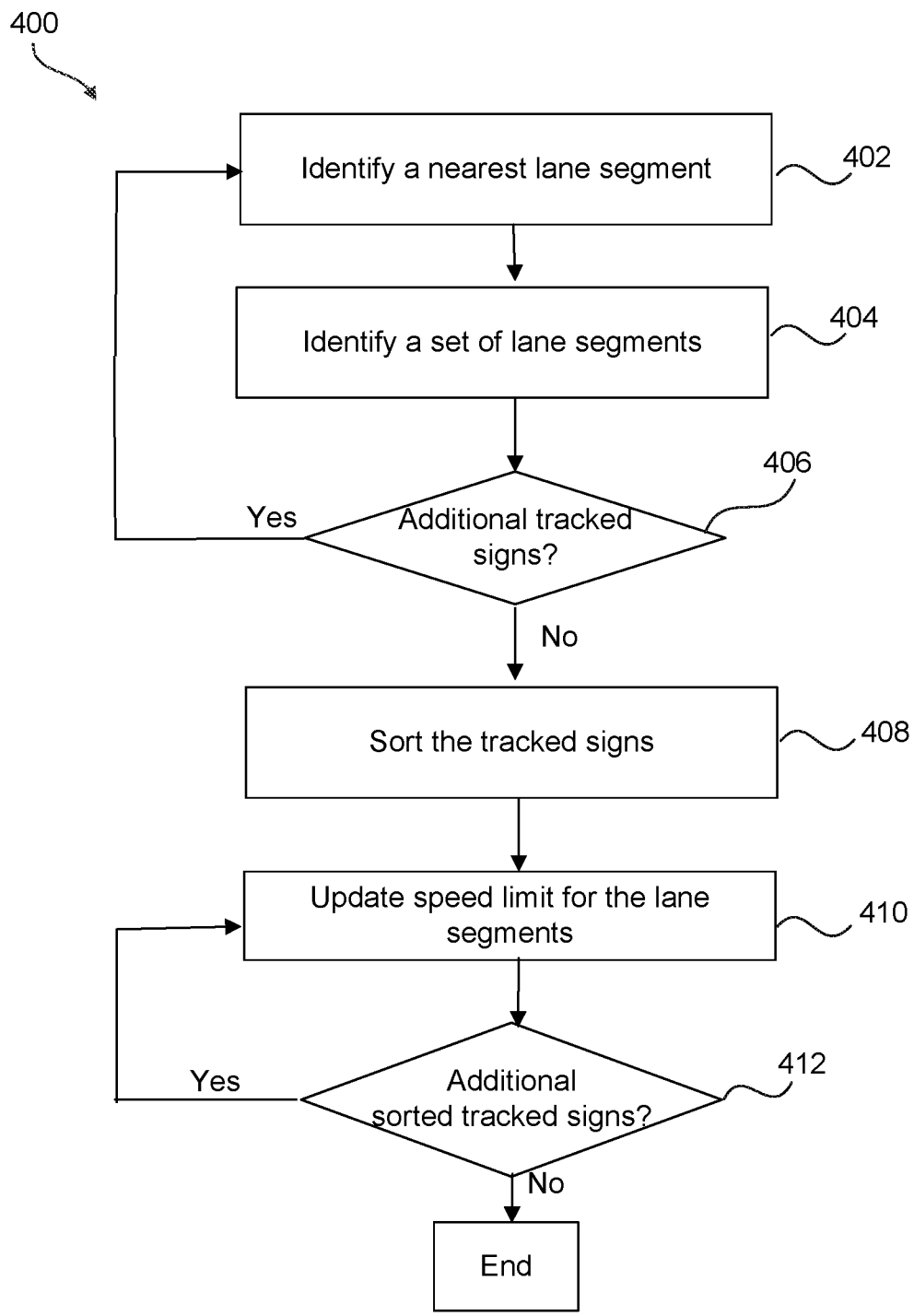
FIG. 4 is a flowchart for a method for generating map updates, in accordance with aspects of the disclosure.

FIG. 4 is a flowchart for a method 400 for generating map updates, in accordance with aspects of the disclosure.

At 402, a nearest lane segment within a position and orientation tolerance of a tracked sign is identified and is associated with the tracked sign. The orientation tolerance may correspond to a geometric tolerance that determines the orientation for the tracked sign in relation to a travel lane. For example, the orientation tolerance may be less than 30 degrees from the direction of travel of the travel lane. The orientation tolerance ensures signs are only associated with lanes they "face", e.g. in which traffic has visibility of the sign face. The position tolerance may correspond to a distance between the median of the lane segment and the tracked sign. According to some aspects of this disclosure, the position tolerance is less than one meter.

At 404, a set of lane segments on the same "road" as the nearest lane segment is identified. Lane segments on the same road are found via a breadth-first search of a lane segment graph in a vector map. The lane segment graph may refer to a graph including lane segments of a road. The breadth-first search may start from the nearest lane segment within a position and orientation tolerance (e.g., the lane segment associated with the tracked sign, etc.). According to some aspects of this disclosure, only same-direction neighbor and successor connections between lane segments are traversed. For example, turning lane segments in intersections may be skipped because they turn off of the original road. For runtime considerations, the search may be terminated after traversing a configurable number of intersections, a configurable distance along the road, and/or the like. This is because another speed limit sign is usually detected after an intersection to indicate the speed limit to vehicles turning onto the road.

At 406, a determination is made whether there are additional tracked signs. In response to determining that there are one or more additional tracked signs (resulting in a "yes" at 406), the process proceeds to 402. In response to determining that there are no more additional tracked signs (resulting in a "no" at 406), the process proceeds to 408. According to some aspects of this disclosure, a counter value may be compared to the number of tracked signs to determine whether there are additional tracked signs. The counter value may be incremented at 404.

At 408, the tracked signs are sorted by their position along the road. Signs can be sorted based on the connection between their associated lane segments in the lane segment graph. For example, if the lane segment associated with a first sign is a successor (or successor of successor, or any successor) of the lane segment associated with a second sign, then the first sign appears farther down the road than the second sign and is sorted after the second sign.

At 410, the posted speed limit of one or more lane segments on the road are updated according to the tracked sign. The posted speed limit is updated as follows. If the sign is unmapped, the posted speed limit of the lane segment is overridden according to the numeric speed limit indicated by the sign type. Overrides are only applied if the override lowers the posted speed limit compared to the a priori mapped speed limit. That is, for appropriate operation, unmapped speed limit detections can only cause the AV to drive slower than the a priori mapped speed limit but not faster.

At 412, a determination is made to whether there are additional sorted tracked signs. In response to determining that there are one or more additional sorted tracked signs, the process proceeds to 410 (resulting in a "yes" at 412). According to some aspects of this disclosure, a counter value may be compared to the number of sorted tracked signs to determine whether there is additional sorted tracked signs. In response to determining that there is no more additional sorted tracked signs, the process ends.

Figure 5A:
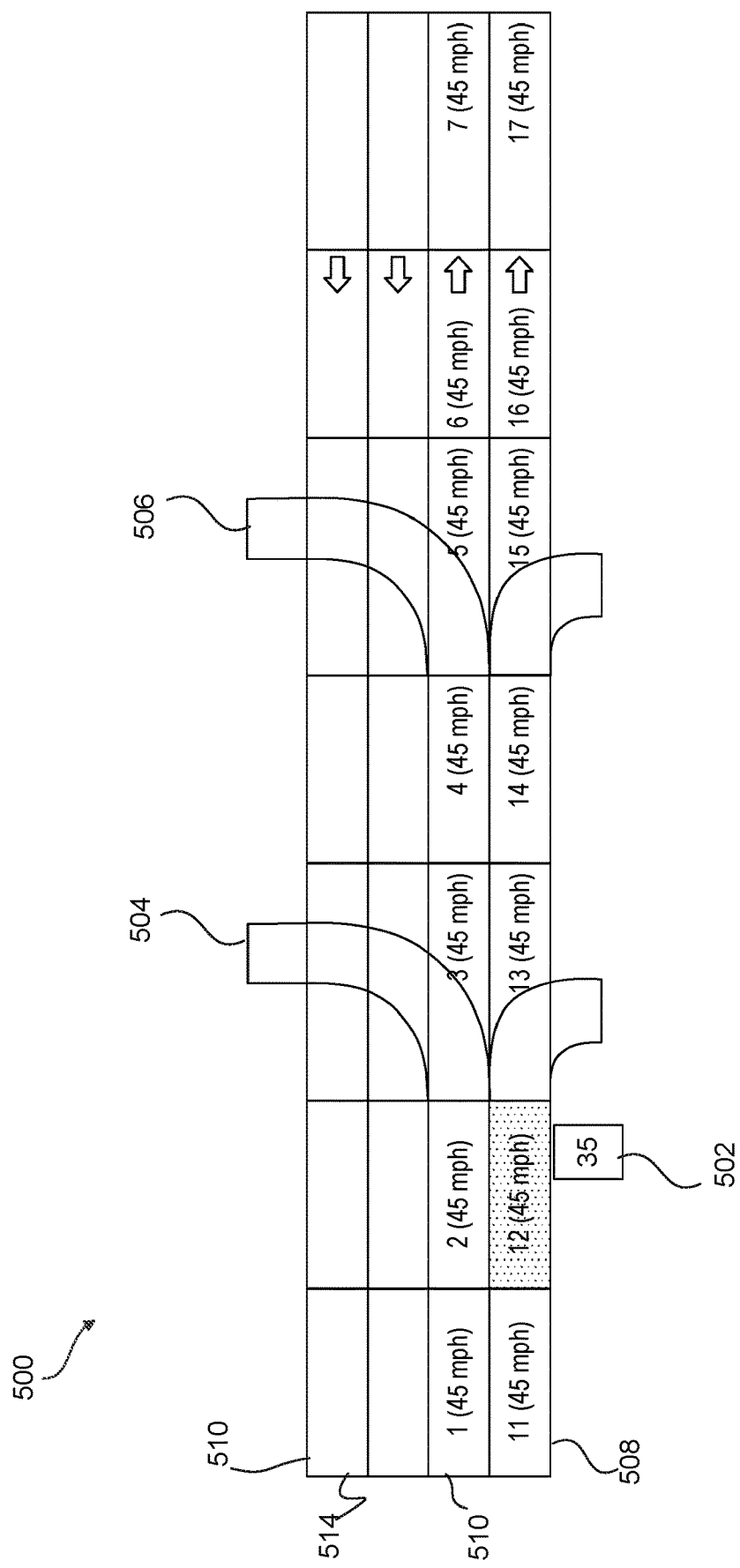
FIG. 5A is a diagram that illustrates a lane segment graph including an unmapped speed limit sign, in accordance with aspects of the disclosure.

FIG. 5A is a diagram that illustrates a lane segment graph 500 with an unmapped speed limit sign, in accordance with aspects of the disclosure. The lane segment graph 500 is associated with a road comprising four travel lanes, a first intersection 504, a second intersection 506, and a third intersection 507. Two travel lanes (a first travel lane 508 and a second travel lane 510) have a first travel direction. Two travel lanes (a third travel lane 512 and a fourth travel lane 514) have a second travel direction different from the first travel direction. A speed limit of 45 mph is associated with each lane segment as shown in the lane segment graph 500. An unmapped sign 502 is detected. The unmapped sign 502 has a speed limit of 35 mph.

The lane segment graph 500 shows lane segments (1, 2, 3, 4, 5, 6, 7, 11, 12, 13, 14, 15, 16, and 17) within the orientation tolerance of the unmapped sign 502. The first travel lane 508 includes lane segments 11, 12, 13, 14, 15, 16, and 17. The second travel lane 510 includes lane segments 1, 2, 3, 4, 5, 6, and 7. The nearest lane segment within a position and orientation tolerance is lane segment 12. Thus, the unmapped sign 502 is associated with lane segment 12. Thereafter, the lane segments on the same road are found via a breadth-first search. The set of lane segments includes (2, 3, 4, 5, 6, 12, 13, 14, 15, and 16). In this example, the search is terminated after the second intersection 506, but before the third intersection 507.

In this example, the most probable sign type of the unmapped sign 502 indicates a speed limit of 35 mph. The speed limit is less than the a priori mapped speed limit of 45 mph for the road so a map update is generated. The map update lowers the posted speed limit of the set of lane segments and the associated segment to 35 mph as shown in FIG. 5B.

Figure 5B:
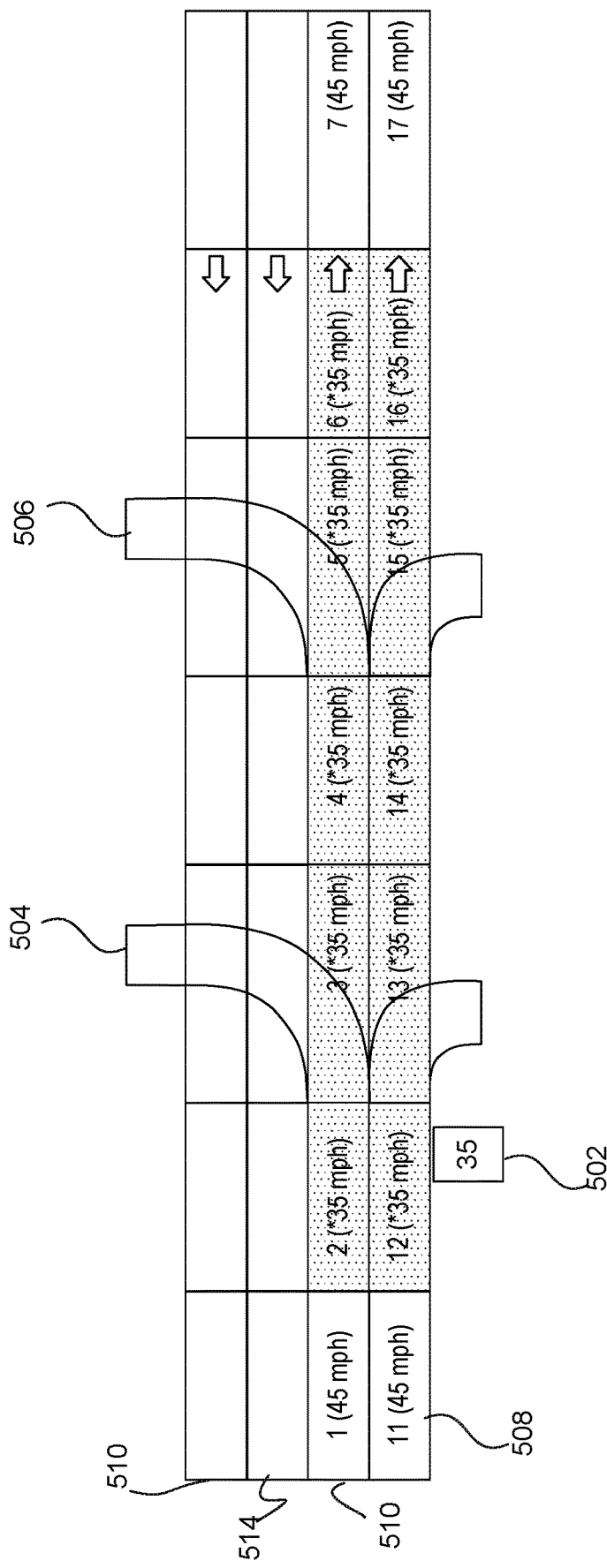
FIG. 5B is a diagram that illustrates map updates for the unmapped speed limit sign, in accordance with aspects of the disclosure.

FIG. 5B is a diagram that illustrates map updates for the unmapped speed limit sign 502, in accordance with aspects of the disclosure. The speed limit of lane segments (2, 3, 4, 5, 6, 12, 13, 14, 15, and 16) is changed to 35 mph. The speed limit of the other lane segments is left unchanged.

Figure 6:
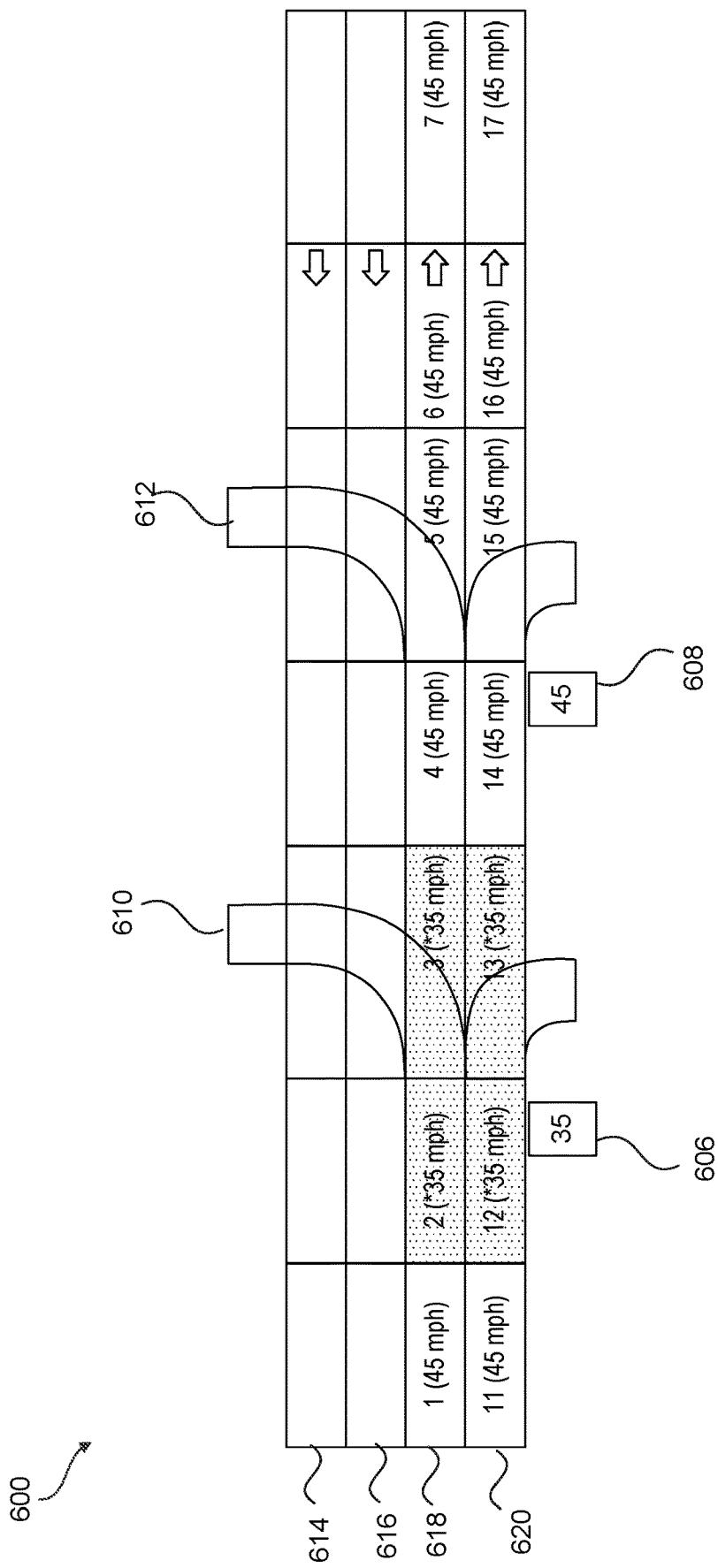
FIG. 6 is a diagram that illustrates map updates for a mapped speed limit and an unmapped speed limit sign, in accordance with aspects of the disclosure.

FIG. 6 is a diagram that illustrates map updates for a mapped speed limit and an unmapped speed limit sign, in accordance with aspects of the disclosure. The lane segment graph 600 is associated with a road comprising four travel lanes, a first intersection 610, a second intersection 612, and a third intersection 613. Two travel lanes have a first travel direction (a first travel lane 618 and a second travel lane 620). Two travel lanes (a third travel lane 614 and a fourth travel lane 616) have a second travel direction different from the first travel direction. A speed limit of 45 mph is associated with each lane segment. An unmapped sign 606 is detected. The unmapped sign 606 has a speed limit of 35 mph. A mapped speed limit sign 608 is detected beyond the unmapped sign 606. The mapped speed limit sign indicates a speed limit of 45 mph.

The lane segment graph 600 shows lane segments (1, 2, 3, 4, 5, 6, 7, 11, 12, 13, 14, 15, 16, and 17) within the orientation tolerance of the unmapped sign 606. Lane segments 1, 2, 3, 4, 5, 6, and 7 are associated with the first travel lane 618. Lane segments 11, 12, 13, 14, 15, 16, and 17 are associated with the second travel lane 620. The nearest lane segment within a position and orientation tolerance is lane segment 12. Thus, the unmapped sign 606 is associated with lane segment 12. Then, the set of lane segments on the same road is found via a breadth-first search. The set of lane segments includes lane segments 2, 3, 4, 5, 6, 12, 13, 14, 15, and 16.

The mapped sign 608 is associated with lane segment 14. The lane segments on the same road as the associated lane segment 14 for the mapped sign 608 are lane segments 4, 5, 6, 7, 14, 15, 16, and 17. According to some aspects of this disclosure, the association of mapped speed limit signs to lane segments in the vector map can be done off board to reduce onboard computation. Speed limit overrides are cleared for all lane segments on the road beyond the mapped sign 608. The mapped sign 608 limits the extent of speed limit overrides based on the unmapped sign 606. That is, the speed limit for the lane segment associated with the mapped sign 608 and the successors of the lane segment 14 in not changed.

Figure 7:
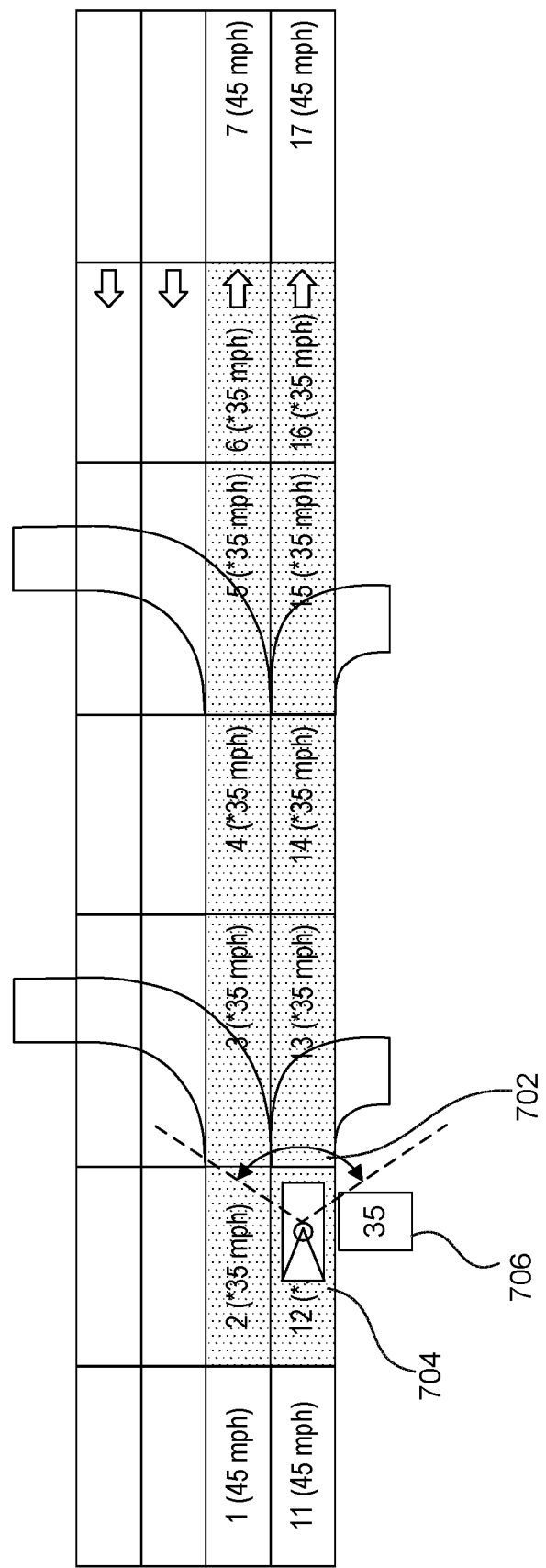
FIG. 7 is a diagram that illustrates a field of view of a vehicle, in accordance with aspects of the disclosure.

FIG. 7 is a schematic that illustrates a field of view 702 of a vehicle 704, in accordance with aspects of the disclosure. Unmapped sign detections and their associated map updates are retained even after the unmapped sign 706 is not in the field of view 702 of the perception system of the vehicle 704 such that the vehicle 704 continues to react appropriately. The perception system (e.g., detection task 306) of the vehicle 704 may no longer detect the unmapped speed limit sign 706 once it has driven past it but the map deviation task (e.g., map deviation task 312 of FIG. 3) persists such that the vehicle 704 still drives at the reduced speed limit.

The map update is propagated to all clients of the a priori map. According to some aspects of this disclosure, an annotation is logged for each unmapped sign detection. According to some aspects of this disclosure, mapping analysts can review these annotations off-board to determine if the a priori map is to be updated. If the unmapped speed limit sign is a new permanently installed sign, the speed limit sign is added to the map and the posted speed limit of lane segments is updated accordingly. If the unmapped sign is only temporary (e.g., associated with a construction project) the a priori map is left unchanged.

According to some aspects of this disclosure, the detection task (e.g., detection task 306 of FIG. 3) may identify the location type of sign in the camera image. The sign type ontology is specified as the enumeration of all possible sign types: a stop sign, a yield sign, a speed limit sign of 25 mph, a speed limit sign of 30 mph, and the like. The perception system and tracking task (unmapped traffic control tracker) attempt to identify a probability distribution across all signs in the sign type ontology given the uncertainty in raw detections. A probability is determined for each sign type and the sum of probabilities across all sign types is equal to one.

Figure 8:
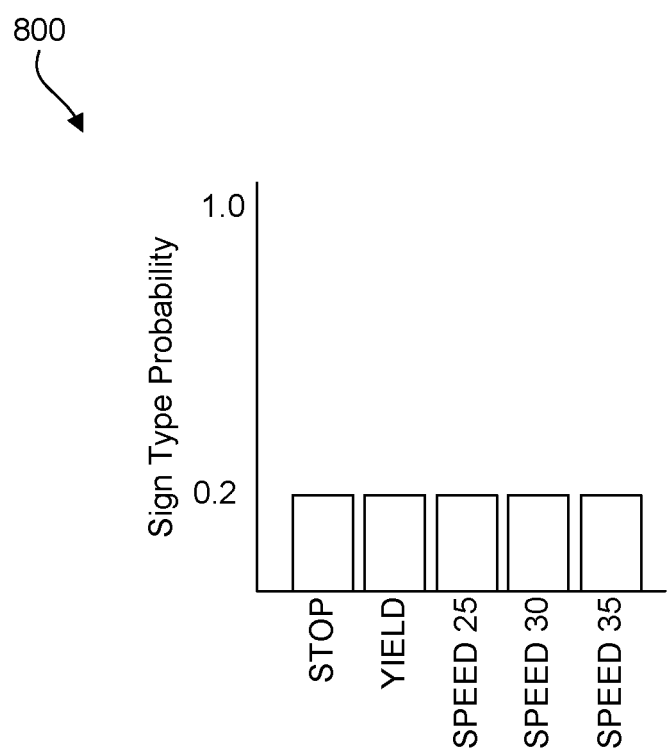
FIG. 8 is a graph that illustrates a sign type probability, in accordance with aspects of the disclosure.

FIG. 8 is a graph 800 that illustrates a sample uniform sign type distribution, in accordance with aspects of the disclosure. Graph 800 shows all signs have equal probability. According to some aspects of this disclosure, graph 800 may show an initial probability of all possible sign types. For example, each sign type may have a probability equal to 0.2. Possible sign types associated with a road may be based on a road type (e.g., a highway versus a local road).

In addition to the probability distribution, a coarse speed limit sign probability may be determined. The coarse speed limit sign probability may represent the sum of probabilities across all speed limit sign types in the sign ontology (e.g., a speed limit sign of 25 mph, a speed limit sign of 30 mph). As the vehicle approaches an unmapped sign from a long distance away, the perception task is generally able to determine whether a given sign detection corresponds to a speed limit sign before being able to determine an actual speed limit depicted on the sign. The tracking task (e.g., tracking task 308) may track the sign type belief over time based on a given instantaneous sign type probabilities from the perception system (e.g., detection task 306) and provide the map deviation task (e.g., map deviation task 312) with a sign type probability distribution.

Figure 9A:
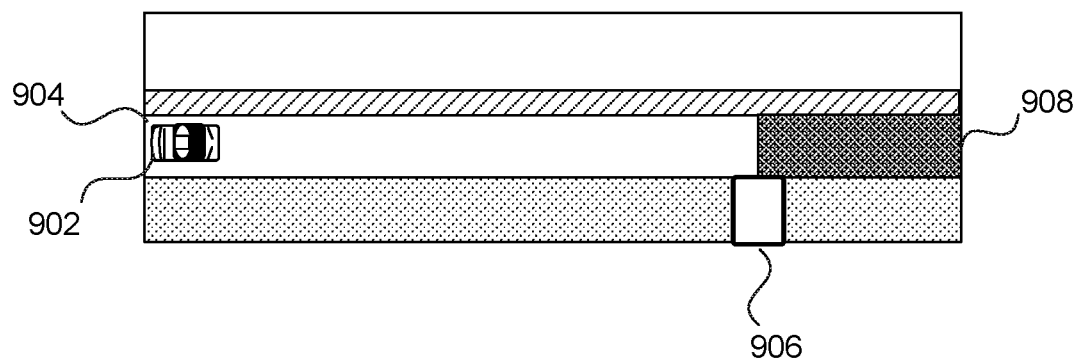
FIG. 9A is a diagram that illustrates a vehicle approaching an unmapped sign, in accordance with aspects of the disclosure.

FIG. 9A is a diagram that illustrates a vehicle approaching an unmapped sign, in accordance with aspects of the disclosure. A vehicle 902 is shown traveling on a road 904. The vehicle 902 may detect an unmapped sign 906.

Figure 9B:
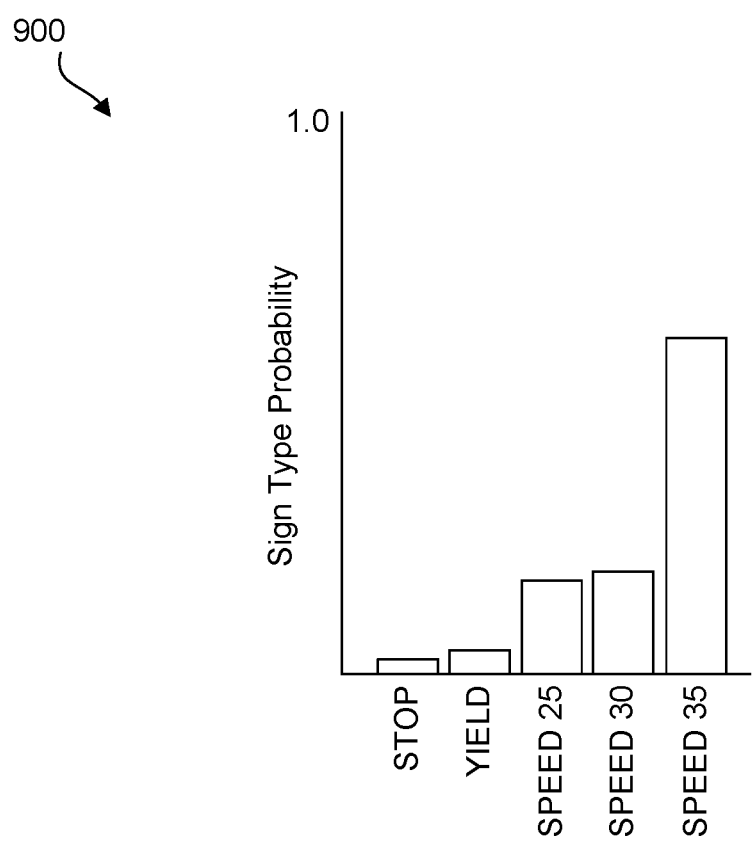
FIG. 9B is a graph that illustrates a sign type probability, in accordance with aspects of the disclosure.

FIG. 9B is a graph 900 that illustrates a sign type probability for the unmapped sign 906, in accordance with aspects of the disclosure. The probability that the sign is unmapped is classified as high confidence (e.g., the sign does not correspond to any mapped speed limit sign). As shown in the graph 900, the probability of the unmapped sign 906 being a speed limit sign of 35 mph is higher than other sign types. Thus, the sign is classified as a 35 mph speed limit sign with high confidence. A map update is generated for an area 908 after the unmapped sign 906.

Figure 10A:
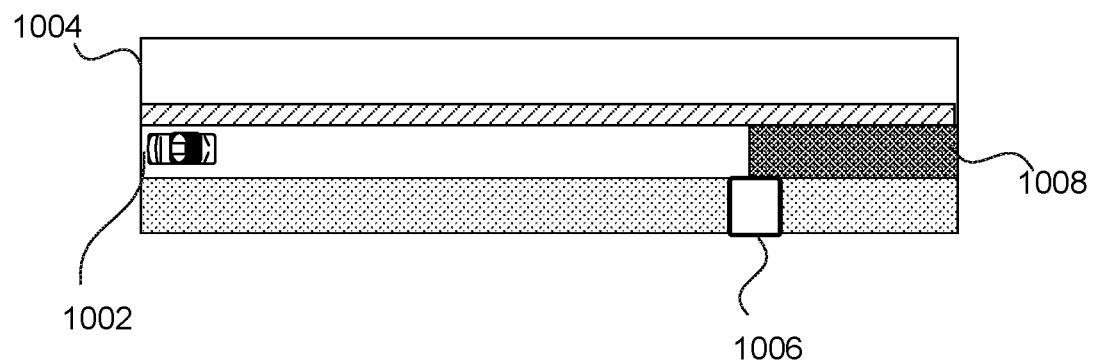
FIG. 10A is a diagram that illustrates a vehicle approaching an unmapped sign, in accordance with aspects of the disclosure.

FIG. 10A is a diagram that illustrates a vehicle approaching an unmapped sign, in accordance with aspects of the disclosure. A vehicle 1002 is traveling on a road 1004. The vehicle 1002 may detect a sign 1006, yet in some examples, may fail to identify, determine, and/or discriminate the actual speed limit depicted on the sign 1006.

Figure 10B:
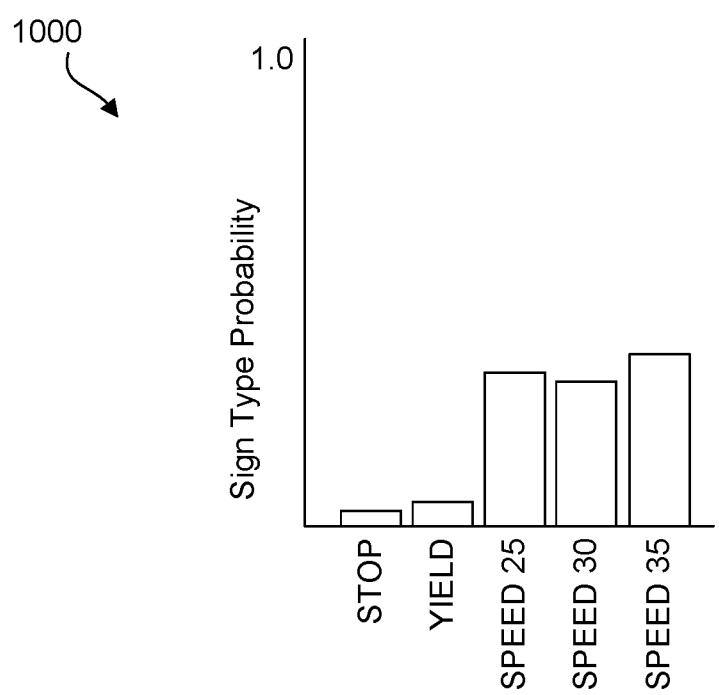
FIG. 10B is a graph that illustrates a sign type probability, in accordance with aspects of the disclosure.

FIG. 10B is a graph 1000 that shows the sign type probability associated with sign 1006 of FIG. 10A. As shown in graph 1000, the probability for the sign type is approximately equal for a speed limit of 25 mph, 30 mph, or 35 mph. According to some aspects of this disclosure, a probability that the sign is unmapped is classified as high confidence (e.g., the sign does not correspond to any mapped sign). Additionally, the probability for the sign to be a speed limit sign is classified as high confidence. In the described case, the probabilities that the sign is a 25 mph, 30 mph, or 35 mph speed limit sign are approximately equal, such that the speed limit indicated by the sign is uncertain.

In this case, the desired behavior is for the vehicle 1002 is to slow down conservatively in the event that the speed limit sign is significantly slower than the mapped speed limit. According to some aspects of this disclosure, the vehicle slows to a nominal speed limit of 25 mph. In other aspects, the vehicle slows to 10-20 mph under a previously mapped speed limit (e.g., speed limit associated with the lane segment in the a priori map).

Figure 11:
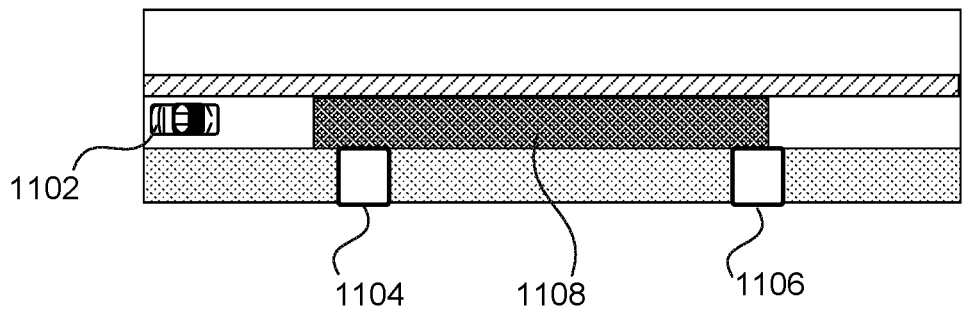
FIG. 11 is a diagram that illustrates a vehicle approaching an unmapped sign and a mapped sign, in accordance with aspects of the disclosure.

FIG. 11 is a diagram that illustrates a vehicle approaching an unmapped sign and a mapped sign, in accordance with aspects of the disclosure. A vehicle 1102 approaches a first sign 1104 and a second sign 1106. The first sign 1104 is identified as an unmapped sign. The probability of the first sign 1104 being a 25 mph speed limit sign is classified as high confidence. The second sign 1106 is identified as a mapped sign. In this example, the mapped speed limit can be confirmed with high confidence. The unmapped speed limit constraint from the unmapped sign is propagated up to the first mapped sign (e.g., the second sign 1106) that is detected with high confidence. Thus, the speed limit of an area 1108 (between the first sign 1104 and the second sign 1106) is updated to 25 mph.

Figure 12:
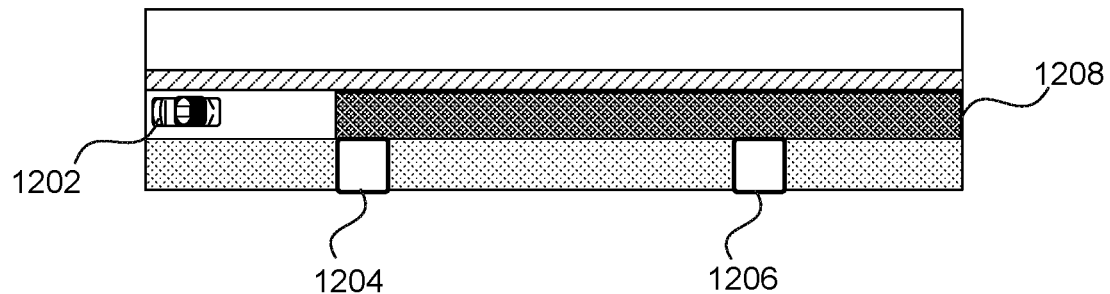
FIG. 12 is a diagram that illustrates a vehicle approaching an unmapped sign and a mapped sign, in accordance with aspects of the disclosure.

FIG. 12 is a diagram that illustrates a vehicle approaching an unmapped sign and a mapped sign, in accordance with aspects of the disclosure. A vehicle 1202 approaches a first sign 1204 and a second sign 1206. The first sign 1204 is identified as an unmapped sign. The probability of the first sign 1204 being a 25 mph speed limit sign is classified as high confidence. The second sign 1206 is identified as a mapped sign. In this example, the mapped speed limit cannot be confirmed by the sensors of the vehicle with high confidence. The unmapped speed limit constraint from the unmapped sign is propagated beyond the detected mapped sign (e.g., the second sign 1206) that is detected with low confidence. Thus, the speed limit of an area 1208 is set to 25 mph. According to some aspects of this disclosure, the confidence of a mapped sign may be low due to factor including, but not limited to, a distance between the sign and the vehicle, viewing and/or perception angle for the sign, lighting conditions, objects obscuring the sign, and/or the like.

A low fine grained confidence sign detection is not enough confirmation to release the speed constraint. A fine grained confidence may refer to the probability of the sign across all speed limit sign types. In order to be confident in the fine grained speed limit sign classification, there are three criteria. First, the coarse class speed limit classification (e.g., sum of probabilities across all speed limit sign types) is above a threshold. Second, the speed limit classes are extracted from the main sign type probability distribution and re-normalized such that the probabilities across all speed limit sign types sum to 1.0. The most likely fine grained normalized probability is above a threshold. Finally, the ratio of the most likely classification to the second most likely classification is above a threshold. This assures that the distribution is unimodal and there is minimal confusion between a small number of sign types.

As described above, when an in-scope unmapped speed limit sign is detected, and the speed limit indicated by the sign is less than the mapped speed limit of the associated road, then upon reaching the unmapped sign the speed of the vehicle is set to the reduced speed limit until a criterion or condition is satisfied. The criterion or condition may be one or more of the following: the vehicle turns left/right off of the road to which the unmapped speed limit sign was associated, the vehicle reaches a detected mapped speed limit sign that matches the mapped speed limit of the road, and/or the vehicle reaches another detected unmapped speed limit sign. When the vehicle reaches another detected unmapped speed limit sign, the latter unmapped speed limit sign determines the speed limit reduction. According to some aspects of this disclosure, the criterion may be satisfied when the vehicle traverses a configurable number of intersections. This may be enabled in the map deviation task of the AV (e.g., the map deviation task 312 of FIG. 3). Speed limit signs are commonly posted after one or two intersections (otherwise vehicles turning onto the road cannot know the speed limit). The map deviation task 312 may determine the number of intersections from the static vector map 302. According to some aspects of this disclosure, the number of crossed intersections is not monitored and the vehicle continues to drive indefinitely at the reduced speed limit. According to some aspects of this disclosure, the criterion may be satisfied when the vehicle travels a configurable distance along the road beyond the unmapped speed limit sign. According to some aspects of this disclosure, the number of crossed intersections and distance along the road may not be considered and the vehicle continues to drive at the reduced speed limit until other criteria are satisfied.

Figure 13:
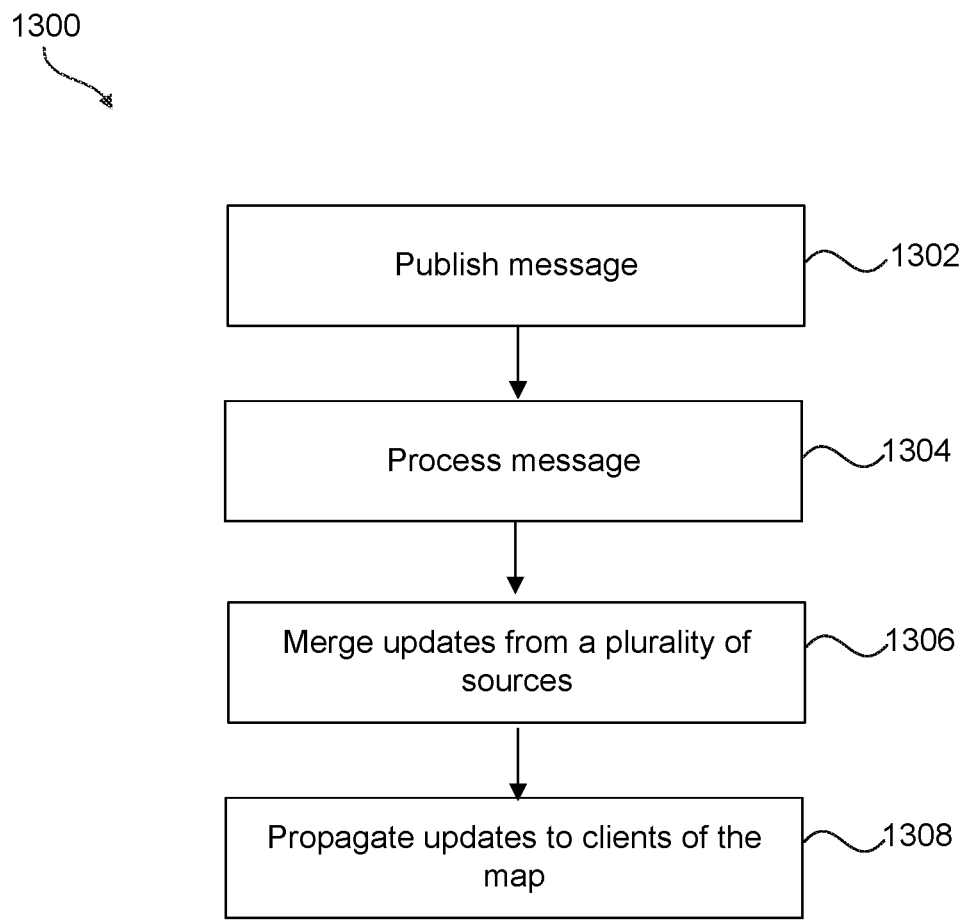
FIG. 13 is a flowchart for a method for propagating map updates, in accordance with aspects of the disclosure.

FIG. 13 is a flowchart for a method 1300 for propagating map updates, in accordance with aspects of the disclosure.

At 1302, a message may be published that includes a type of the unmapped sign (e.g., stop signs, yield signs, and speed limit signs with 5 mph increments).

At 1304, the message may be received by the map deviation task. The map deviation task may process the message and output one or more attributes. The one or more attributes may correspond to an updated speed limit for one or more lane segments. The one or more lane segments that the unmapped speed limit sign applies to are identified based on the position and orientation of the sign. All the lane segments on the same road are identified as the "controlled" lane segment by a breadth-first search of neighbors and successors as described previously herein. The autonomous speed limit on the indicated road may be updated. The sign ontology is converted to a numeric speed limit in m/s.

At 1306, updates from different sources may be merged. In addition to updates from unmapped signs, remote operators may apply updates to lower the speed limits associated with lane segments in the map. For example, according to some aspects of this disclosure, an unmapped stop sign and/or the like may be detected and/or identified, and remote guidance (e.g., via remote guidance operators, etc.) may apply similar updates to lower the speed limit for a specific vehicle, and/or the speed limit of a particular lane segment for all vehicles in a fleet and/or the like. Each update may have a different priority level (e.g., deferred, interactive, immediate) associated with it. The merged updates may be propagated to clients of the map. Speed limit updates may be associated with an immediate priority level.

At 1308, the updates are propagated to the clients of the map. The updates may be propagated based on the priority level. For example, the map update classified as immediate may be propagated immediately when generated.

Figure 14:
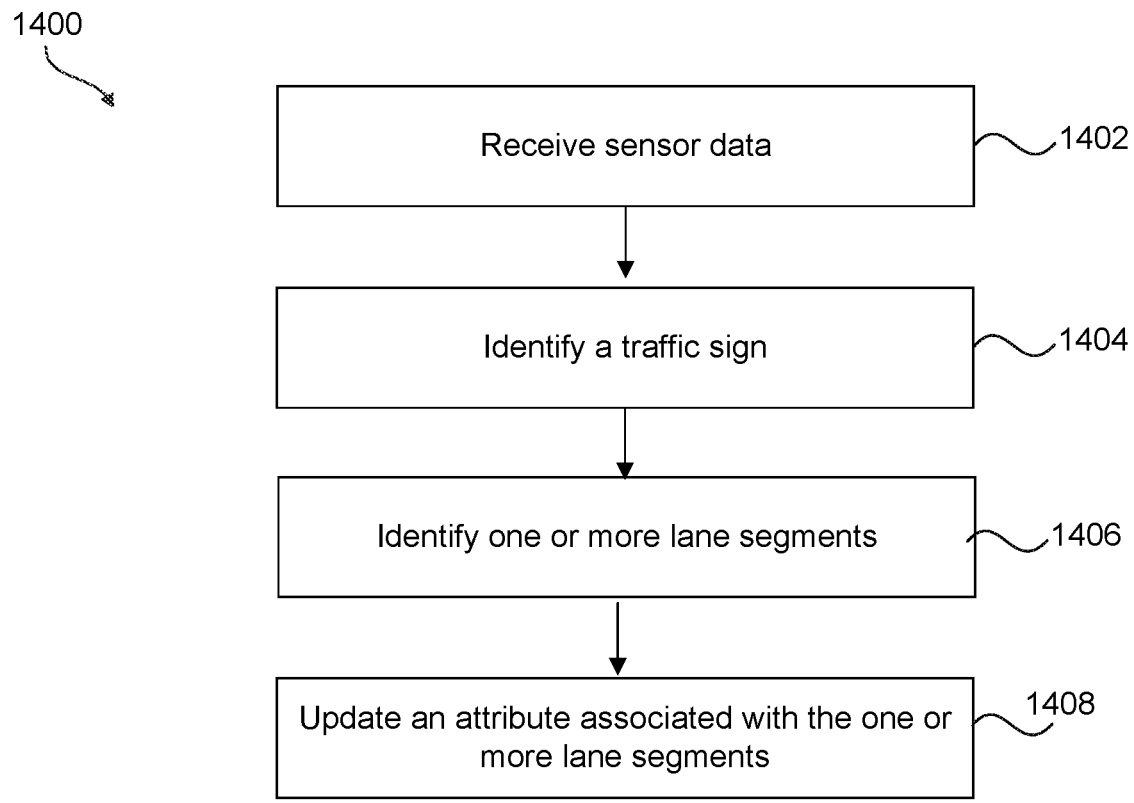
FIG. 14 is a flowchart for a method for handling unmapped traffic signs, in accordance with aspects of the disclosure.

FIG. 14 is a flowchart for a method 1400 for handling unmapped traffic signs, in accordance with aspects of the disclosure.

At 1402, sensor data are received from a sensor of a vehicle.

At 1404, a traffic sign is identified within a field of view of the vehicle based on the sensor data. The traffic sign may be a speed limit sign. In addition, as described previously herein, the type of the traffic sign may be tracked and the probability associated with each type is updated as the vehicle approaches the detected traffic sign.

At 1406, one or more lane segments of a road associated with the identified traffic sign are identified based on a determination that the identified traffic sign is not mapped in the a priori map.

At 1408, an attribute associated with a segment of the one or more lane segments of the road are updated based on a determination that a detected attribute corresponding to the identified sign is more restrictive than an attribute associated with the lane segment in the a priori map. The attribute may be indicative of a speed limit for the segment. For example, the speed limit is updated if the speed limit is less than the speed limit associated with the lane segment in the a priori map.

Figure 15:
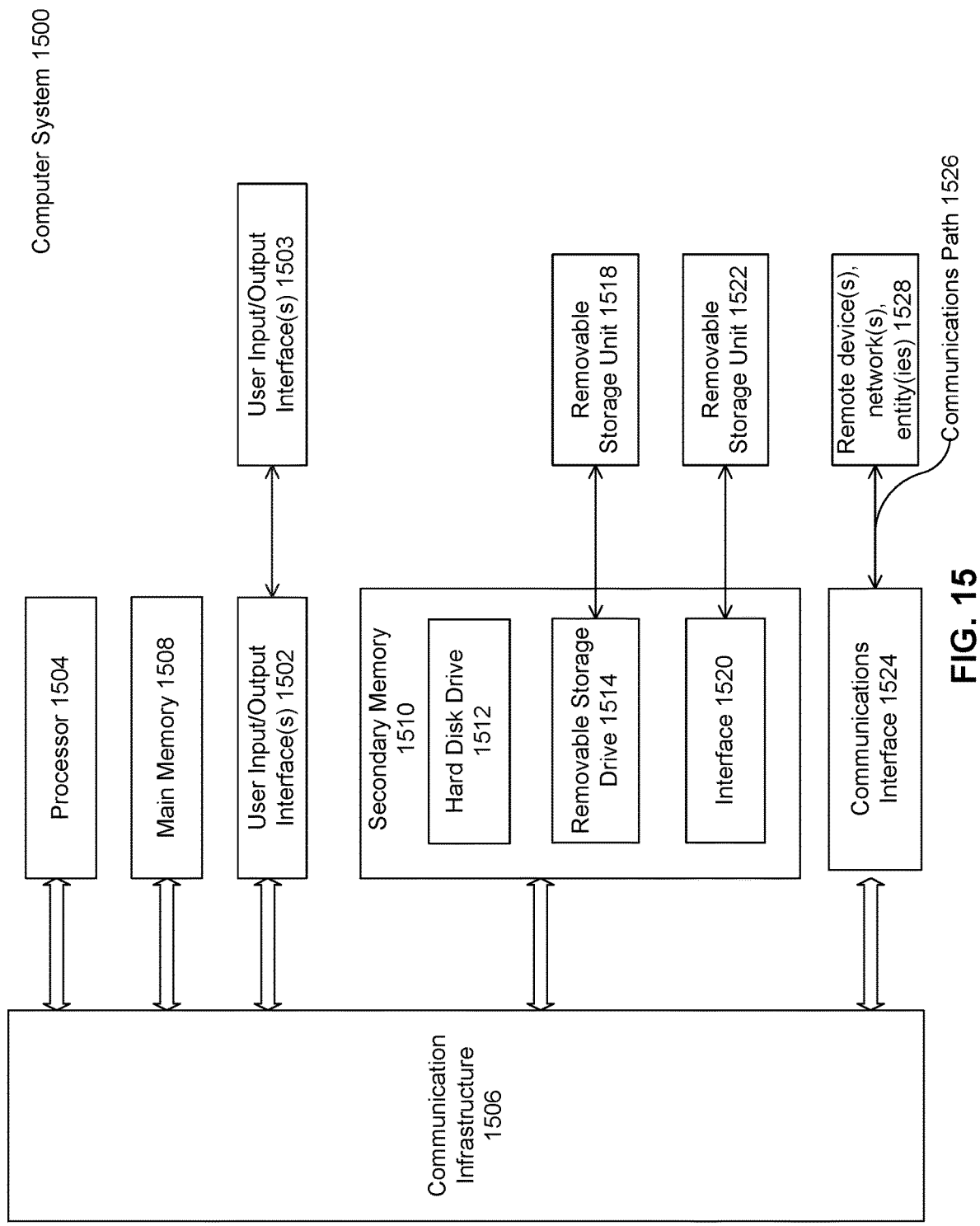
FIG. 15 is an example computer system useful for implementing various embodiments.

Various embodiments can be implemented, for example, using one or more computer systems, such as computer system 1500 shown in FIG. 15. Computer system 1500 can be any computer capable of performing the functions described herein.

Computer system 1500 includes one or more processors (also called central processing units, or CPUs), such as a processor 1504. Processor 1504 is connected to a communication infrastructure or bus 1506.

One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes user input/output device(s) 1503, such as monitors, keyboards, pointing devices, etc., that communicate with communication infrastructure or bus 1506 through user input/output interface(s) 1502.

Computer system 15100 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some aspects of this disclosure, secondary memory 1510 may include other means, instrumentalities or other approaches for allowing computer programs and/or other instructions and/or data to be accessed by computer system 11500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

According to some aspects of this disclosure, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 15. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," "some aspects," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

identifying, using one or more computer devices, a traffic sign within a field of view of a vehicle based on the sensor data from a sensor of a vehicle;

identifying, using the one or more computer devices, one or more lane segments of a road associated with the identified traffic sign based on a determination that the identified traffic sign is not mapped in a priori map;

updating, by the one or more computer devices, an attribute associated with a segment of the one or more lane segments of the road based on a determination that a detected attribute corresponding to the identified traffic sign is more restrictive than the attribute associated with the lane segment in the a priori map;

identifying, by the one or more computer devices, a neighbor segment of a proximate lane segment and a successor segment of the proximate lane segment, wherein the proximate lane segment is within a position and an orientation threshold of the identified traffic sign, and wherein the neighbor segment and the successor segment have a same travel direction as the proximate lane segment;

updating, by the one or more computer devices, a speed limit associated with at least one of the neighbor segment or the successor segment in response to a failure to identify a mapped traffic sign associated with the neighbor segment or the successor segment; and adjusting, by the one or more computer devices, a vehicle trajectory for the vehicle based on the identified traffic sign and a predicted action of an actor that is proximate to the vehicle, wherein the predicted action is predicted based on the identified traffic sign and the updated speed limit.

2. The method of claim 1, further comprising:

tracking a probability distribution of a type of the identified traffic sign over time.

3. The method of claim 1, wherein the identified traffic sign is a speed limit sign and wherein the attribute is a speed limit associated with the one or more lane segments.

4. The method of claim 1, further comprising:
comparing data associated with the identified traffic sign with a record of false positive detections; and
disregarding the identified traffic sign based on a determination that the identified traffic sign is a false positive.

5. The method of claim 1, further comprising:
logging an annotation for the identified traffic sign when the identified traffic sign is an unmapped sign; and
updating the a priori map based on a determination that the unmapped sign is a permanent traffic sign.

6. The method of claim 1, further comprising:
comparing the identified traffic sign to signs in the a priori map to determine whether the identified traffic sign is mapped, wherein the identified traffic sign is mapped when a type of the identified traffic sign matches a type of a mapped sign in the a priori map and is within a position and orientation tolerance of the mapped sign.

7. The method of claim 1, further comprising:
updating a record of false positive detections in response to determining that the identified traffic sign is a false positive detection.

8. A system, comprising:
a memory; and
at least one processor coupled to the memory and configured to:
identify a traffic sign within a field of view of a vehicle based on the sensor data from a sensor of the vehicle;
identify one or more lane segments of a road associated with the identified traffic sign based on a determination that the identified traffic sign is not mapped in a priori map;
update an attribute associated with a segment of the one or more lane segments of the road based on a determination that a detected attribute corresponding to the identified traffic sign is more restrictive than the attribute associated with a lane segment in the a priori map;
identify a neighbor segment of a proximate lane segment and a successor segment of the proximate lane segment, wherein the proximate lane segment is within a position and an orientation threshold of the identified traffic sign, and wherein the neighbor segment and the successor segment have a same travel direction as the proximate lane segment;
update a speed limit associated with at least one of the neighbor segment or the successor segment in response to a failure to identify a mapped traffic sign associated with the neighbor segment or the successor segment; and
adjust a vehicle trajectory for the vehicle based on the identified traffic sign and a predicted action of an actor that is proximate to the vehicle, wherein the predicted action is predicted based on the identified traffic sign and the updated speed limit.

9. The system of claim 8, wherein the at least one processor is further configured to:
track a probability distribution of a type of the identified traffic sign over time.

10. The system of claim 8, wherein the identified traffic sign is a speed limit sign and wherein the attribute is a speed limit associated with the one or more lane segments.

11. The system of claim 8, wherein the at least one processor is further configured to:
compare data associated with the identified traffic sign with a record of false positive detections; and
disregard the identified traffic sign based on a determination that the identified traffic sign is a false positive.

12. The system of claim 8, wherein the at least one processor is further configured to:
log an annotation for the identified traffic sign when the identified traffic sign is an unmapped sign; and
update the a priori map based on a determination that the unmapped sign is a permanent traffic sign.

13. A non-transitory computer-readable medium having instructions stored thereon that, when executed by at least one computing device, cause the at least one computing device to perform operations comprising:
identifying a traffic sign within a field of view of a vehicle based on sensor data from a sensor of the vehicle;
identifying one or more lane segments of a road associated with the identified traffic sign based on a determination that the identified traffic sign is not mapped in a priori map; and
updating an attribute associated with a segment of the one or more lane segments of the road based on a determination that a detected attribute corresponding to the identified sign is more restrictive than an attribute associated with the lane segment in the a priori map;
identifying a neighbor segment of a proximate lane segment and a successor segment of the proximate lane segment, wherein the proximate lane segment is within a position and an orientation threshold of the identified traffic sign, and wherein the neighbor segment and the successor segment have a same travel direction as the proximate lane segment;
updating a speed limit associated with at least one of the neighbor segment or the successor segment in response to a failure to identify a mapped traffic sign associated with the neighbor segment or the successor segment; and
adjusting a vehicle trajectory for the vehicle based on the identified traffic sign and a predicted action of an actor that is proximate to the vehicle, wherein the predicted action is predicted based on the identified traffic sign and the updated speed limit.

14. The non-transitory computer-readable medium of claim 13, the operations further comprising:
tracking a probability distribution of a type of the identified traffic sign over time.

15. The non-transitory computer-readable medium of claim 13, the operations further comprising:
comparing data associated with the identified traffic sign with a record of false positive detections; and
disregarding the identified traffic sign based on a determination that the identified traffic sign is a false positive.

* * * * *